United States Patent
Leyda et al.

(10) Patent No.: US 10,831,393 B2
(45) Date of Patent: Nov. 10, 2020

(54) PARTIAL SAVE OF MEMORY

(71) Applicant: Micron Technology, Inc., Boise, ID (US)

(72) Inventors: Jeffery J. Leyda, Minneapolis, MN (US); Nathan A. Eckel, Lucas, TX (US)

(73) Assignee: Micron Technology, Inc., Boise, ID (US)

( * ) Notice: Subject to any disclaimer, the term of this patent is extended or adjusted under 35 U.S.C. 154(b) by 90 days.

(21) Appl. No.: 16/113,221

(22) Filed: Aug. 27, 2018

(65) Prior Publication Data
US 2019/0243575 A1    Aug. 8, 2019

Related U.S. Application Data

(60) Provisional application No. 62/628,157, filed on Feb. 8, 2018.

(51) Int. Cl.
*G06F 12/00* (2006.01)
*G06F 3/06* (2006.01)
*G06F 12/0804* (2016.01)

(52) U.S. Cl.
CPC ............ *G06F 3/0647* (2013.01); *G06F 3/068* (2013.01); *G06F 3/0619* (2013.01);
(Continued)

(58) Field of Classification Search
CPC ...... G06F 3/0647; G06F 3/0619; G06F 3/068; G06F 12/0804; G06F 2212/1032; G06F 2212/205
See application file for complete search history.

(56) References Cited

U.S. PATENT DOCUMENTS 9,460,791 B1 * 10/2016 Shallal .................... G11C 7/08
10,044,958 B1 * 8/2018 Liobe ..................... H04N 5/379
(Continued)

FOREIGN PATENT DOCUMENTS

CN          105183379       12/2015
TW          M415338         11/2011
(Continued)

OTHER PUBLICATIONS

"International Application Serial No. PCT US2019 016623, International Search Report dated May 15, 2019", 3 pgs.
(Continued)

*Primary Examiner* — Prasith Thammavong
(74) *Attorney, Agent, or Firm* — Schwegman Lundberg & Woessner, P.A.

(57) ABSTRACT

A variety of applications can include systems and/or methods of partial save of memory in an apparatus such as a non-volatile dual in-line memory module. In various embodiments, a set of control registers of a non-volatile dual in-line memory module can be configured to contain an identification of a portion of dynamic random-access memory of the non-volatile dual in-line memory module from which to back up content to non-volatile memory of the non-volatile dual in-line memory module. Registers of the set of control registers may also be allotted to contain an amount of content to transfer from the dynamic random-access memory content to the non-volatile memory. Additional apparatus, systems, and methods are disclosed.

19 Claims, 6 Drawing Sheets

(52) U.S. Cl.
CPC .. *G06F 12/0804* (2013.01); *G06F 2212/1032* (2013.01); *G06F 2212/205* (2013.01)

(56) References Cited

U.S. PATENT DOCUMENTS

| | | | | |
|---|---|---|---|---|
| 10,261,700 | B1* | 4/2019 | Serebrin | G06F 3/0679 |
| 2003/0188220 | A1 | 10/2003 | Misra et al. | |
| 2004/0128471 | A1* | 7/2004 | Oakley | G06F 12/0638 |
| | | | | 711/220 |
| 2005/0228980 | A1* | 10/2005 | Brokish | G06F 21/74 |
| | | | | 713/2 |
| 2006/0015683 | A1* | 1/2006 | Ashmore | G06F 1/3203 |
| | | | | 711/113 |
| 2007/0033431 | A1* | 2/2007 | Pecone | G06F 1/28 |
| | | | | 714/6.12 |
| 2007/0033432 | A1* | 2/2007 | Pecone | G06F 1/305 |
| | | | | 714/6.12 |
| 2007/0033433 | A1* | 2/2007 | Pecone | G06F 1/305 |
| | | | | 714/6.13 |
| 2007/0288687 | A1 | 12/2007 | Panabaker | |
| 2009/0077314 | A1 | 3/2009 | Marwood, Jr. et al. | |
| 2010/0205348 | A1* | 8/2010 | Moshayedi | G11C 5/14 |
| | | | | 711/102 |
| 2012/0131290 | A1 | 5/2012 | Hamilton et al. | |
| 2014/0181427 | A1 | 6/2014 | Jayasena et al. | |
| 2017/0109058 | A1* | 4/2017 | Shallal | G06F 3/0613 |
| 2017/0212700 | A1 | 7/2017 | Lee | |
| 2018/0246643 | A1* | 8/2018 | Jenne | G11C 11/4096 |

FOREIGN PATENT DOCUMENTS

| | | |
|---|---|---|
| TW | 201405298 | 2/2014 |
| TW | I530791 | 4/2016 |
| TW | 201941057 | 10/2019 |
| WO | 2019156965 | 8/2019 |

OTHER PUBLICATIONS

"International Application Serial No. PCT US2019 016623, Written Opinion dated May 15, 2019", 7 pgs.
"Taiwanese Application Serial No. 108104257, Office Action dated Mar. 25, 2020", w English Translation, 16 pgs.
"Taiwanese Application Serial No. 108104257, Response filed Jun. 19, 2020 to Office Action dated Mar. 25, 2020", w English Claims, 35 pgs.
"Taiwanese Application Serial No. 108104257, Office Action dated Jul. 9, 2020", w Concise Statement of Relevance, 10 pgs.
"International Application Serial No. PCT US2019 016623, International Preliminary Report on Patentability dated Aug. 20, 2020", 9 pgs.

* cited by examiner

PARTIAL SAVE OF MEMORY

PRIORITY APPLICATION

This application claims the benefit of priority to U.S. Provisional Application Ser. No. 62/628,157, filed 8 Feb. 2018, which is incorporated herein by reference in its entirety.

TECHNICAL FIELD

Embodiments of the disclosure relate generally to memory sub-systems, and more specifically, relate to managing a memory sub-system including partial save of memory.

BACKGROUND

A memory sub-system can be a storage system, such as a non-volatile dual in-line memory module (NVDIMM), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
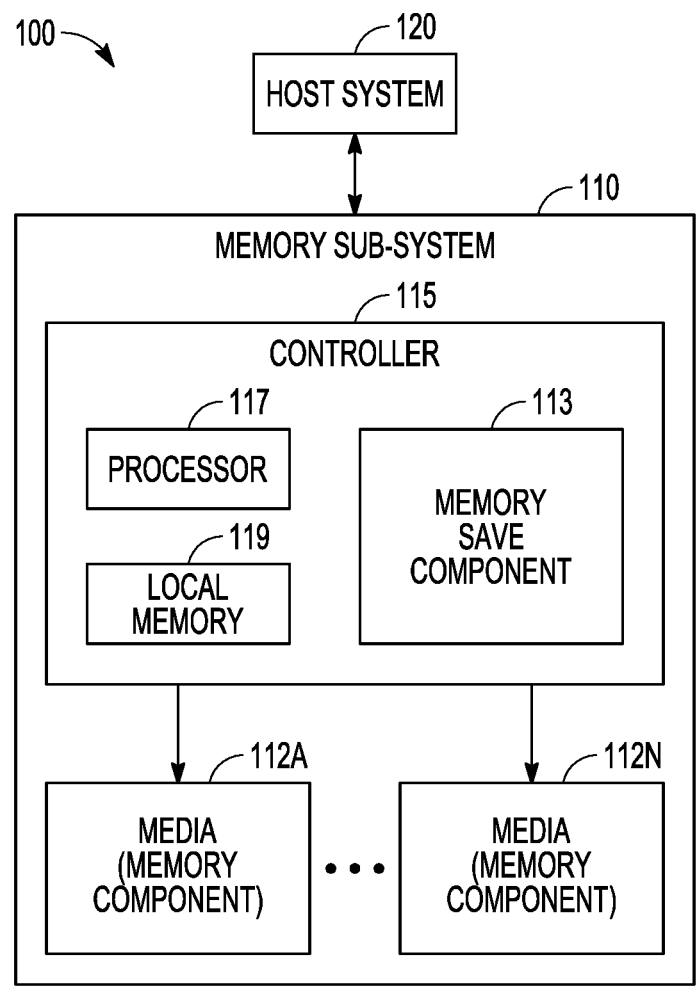
FIG. 1 illustrates an example computing environment that includes a memory sub-system, in accordance with various embodiments.

Aspects of the present disclosure are directed to managing a memory sub-system, which management includes implementing partial memory save. A memory sub-system is also hereafter referred to as a "memory device". An example of a memory sub-system is a storage system, such as a non-volatile dual in-line memory module (NVDIMM). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

A non-volatile dual in-line memory module (NVDIMM) is a type of random-access memory that has volatile memory for normal operation and non-volatile memory in which to dump the contents of the volatile memory if the power fails, using an on-board backup power source. NVDIMM-N is a dual in-line memory module (DIMM) typically with flash storage and traditional dynamic random-access memory (DRAM) on the same module. A host processing unit can access the traditional DRAM directly. A host, with respect to a memory unit, can be structured as one or more processors that control data in and out of the memory unit in response to an application being run by the host. In the event of a power failure, the NVDIMM-N copies all the data from its volatile traditional DRAM or set of DRAMS to its persistent flash storage and copies all the data back to the volatile traditional DRAM or set of DRAMS, when power is restored. The transfer of the state of all the DRAM data into persistent data on the persistent flash storage can be performed on a power cycle. The NVDIMM has its own battery backup power source or access to a dedicated power source to allow the NVDIMM to complete the save.

In various embodiments, a set of control registers in a NVDIMM can be implemented to provide for a partial save of memory in the NVDIMM to non-volatile memory, where "memory" refers to the main memory of the NVDIMM. The main memory is the volatile memory, such as a DRAM, which stores user data. The set of control registers can provide a mechanism to conduct a partial save by containing a starting offset of a portion of the volatile memory to identify a start of a save operation and by containing an amount of content of the volatile memory to be saved. A host can populate the set of control registers in the NVDIMM with an identification of a start of a save operation and an amount of content for the save operation. This set of control registers can also control the inverse operation that restores the partial save back to the volatile memory of the NVDIMM. This structure for maintaining data stored on a NVDIMM provides a host with added flexibility to handle user data with respect to applications for which the host is processing. The host is provided access to perform a full content or a partial content save at any offset. This can provide the host with the ability to have better control, and more control over what is saved and restored.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system 110 is a storage system. An example of a storage system is a NVDIMM. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code.

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a memory save component 113 that can be used to perform a partial save of memory. The memory save component 113 can include instructions executed by processor 117. Such instructions can be included in microcode for operating the controller 115. The memory save component 113 can be used to receive a starting offset of a portion of dynamic random-access memory from which a save operation to a non-volatile memory starts and an amount of content to save and to load the starting offset and the amount of content to save into a set of registers of the non-volatile dual in-line memory module. The memory save component 113 can be also be used to save content of the portion of the dynamic random-access memory into the non-volatile memory, based on the starting offset and the amount of content loaded into the set of registers, in response to an occurrence of a host related event with respect to the host 120 operatively coupled to the memory sub-system 110. The host 120 related event can be a power loss of the host. Further details with regards to the operations of a memory save component similar to the memory save component 113 are described below.

Figure 2:
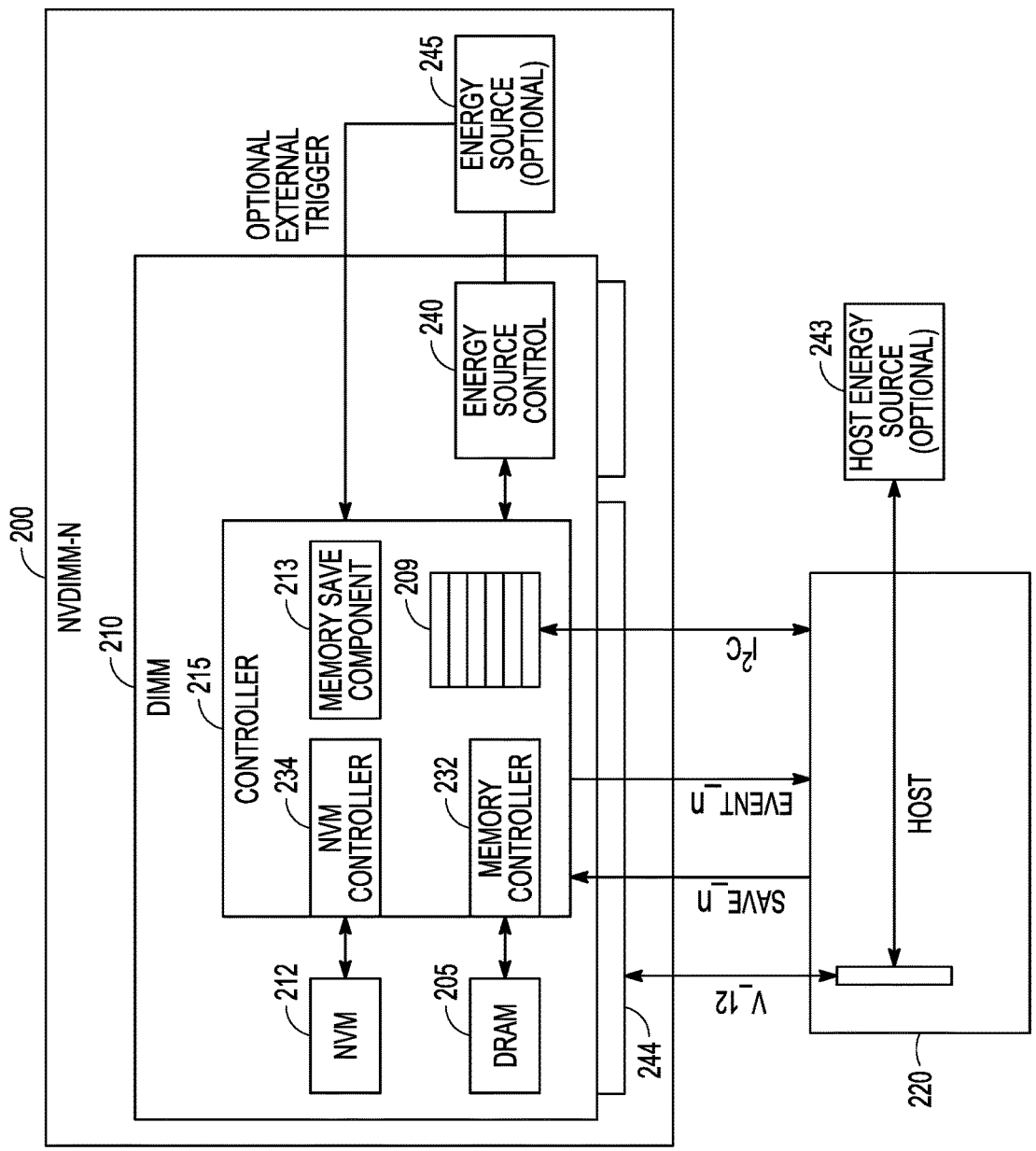
FIG. 2 is a block diagram of an example non-volatile dual in-line memory module structured with a set of control registers to provide the capability to perform a partial save from volatile memory to non-volatile memory and a corresponding restore from non-volatile memory back to volatile memory, in accordance with various embodiments.

FIG. 2 is a block diagram of an embodiment of an example NVDIMM-N 200 structured with a set of control registers 209 to provide the capability to perform a partial save from volatile memory 205 to non-volatile memory (NVM) 212 and a corresponding restore from the NVM 212 back to the volatile memory 205. The volatile memory 205 can be realized by a DRAM 205 that can be arranged as a set of DRAM devices to store user data, and the NVM 212 can be arranged to back up contents of the dynamic random-access memory. The NVM 212 can be realized as a NAND flash memory. The set of control registers 209 can be configured to contain an identification of a portion of the DRAM 205 from which to back up content to the NVM 212. The NVDIMM-N 200 can be structured as a standard platform DIMM 210 with the DRAM 205 and the NVM 212 integrated on the DIMM 210. The set of control registers 209 can persist through a power cycle.

In a traditional operation, a catastrophic save operation can be performed by the NVDIMM-N 200 to copy the DRAM 205 contents into the NVM 212, when host power is lost, using an energy source 245 managed by an energy source control 240 by the NVDIMM-N 200 or using an energy source 243 managed by a host 220 via a V_12 pin 244. A save_n signal on a save_n pin can initiate the catastrophic save operation. The NVDIMM-N 200 can notify a host 220 via event_n if something did not complete successfully. The completion is a status in the configuration that can be read over an inter integrated circuit ($I^2C$) bus 242. The set of control registers 209 can include registers to receive messages from the host 220 from the $I^2C$ bus 242.

The set of control registers 209 can be arranged in a controller 215 or arranged on the NVDIMM-N 200 separate from controller 215. The controller 215 can include a non-volatile memory controller (NVM controller) 234 to control operations with respect to the NVM 212 and a memory controller 232 to control operations with respect to the DRAM 205. The controller 215 can include processing circuitry in conjunction with instructions for the controller 215 to control the transfer of data from the DRAM 205 to the NVM 212 and back from the NVM 212 to the DRAM 205. These instructions can be realized in a memory save component 213, such as microcode in memory save component 213. Alternatively, these instructions can be stored on DIMM 210 exterior to the controller 215. Such instructions can be included in controller firmware, which comprises instructions, such as a microcode, which when executed by the corresponding controller, can cause performance of operations for which the controller is intended to perform. The set of control registers 209 can be configured to contain a starting offset of the portion of the DRAM 205 from which a save operation to the NVM 212 starts and an amount of content to save. Registers in the set of registers 209 can be allocated for operation with respect to a partial save of memory from the DRAM 205 to the NVM 212.

The NVDIMM-N 200 can be operable to store the contents of the identified portion of the DRAM 205 in the NVM 212 in a non-power off mode. A non-power off mode is a mode in which the system is running without detection of a power loss or an imminent power loss. In the non-power off mode, the host 220 is up and running and can be operated to use the capability of the NVDIMM-N 200 for partial save of memory. The host 220 can be provided with the ability to store portions of main memory to non-volatile space at any time when the host is up and running, not just on power cycle. The host 220 can communicate over the $I^2C$ bus 242 with a message to inform the controller 215 to store a selected portion of data in a storage area that is volatile into an area of non-volatile memory and, subsequently restore the selected portion of data.

The host 220 can have a command set that includes a command to the NVDIMM-N 200 to store the contents of the identified portion of the DRAM 205 to the NVM 212 with the host 220 in a non-power off mode. The controller 215 can be configured to execute the command received from the host 220, which may be received over $I^2C$ bus 242. The host 220 can have an application program interface (API) with the NVDIMM-N 200 to specify a starting offset in the portion of the DRAM 205 from which a save operation to the NVM 212 starts and an amount of content to save to be loaded into the set of control registers 209. An API is a set of routines, protocols, and tools that specify the manner in which software components should interact. The starting offset can be in the form of a starting address bit, an address pointer, or other format to identify a starting location. Host 220 can also use an API that specifies a range length of data to be stored.

Associated with the partial save is an address mapping. The address mapping maps the logical address of the data being saved to its physical location. Address mapping logic can be disposed in the NVM controller 234 in the NVC such that a basic input/output system (BIOS) can set the same map in the NVM controller 234 as the map of the host 220. BIOS is non-volatile firmware used to perform hardware initialization during the booting process, which is power-on startup. The BIOS can provide runtime services for operating systems and programs. The logical address to physical location mapping associated with a partial save can be loaded by the BIOS during boot. Address bits can be muxed to select column/row/bank/bank group in the save starting locations and length.

The NVDIMM-N 200 can be operable to store the contents of the identified portion of the DRAM 205 in the NVM 212 upon power loss by the host 220 coupled to the NVDIMM-N 200, or a detection of power loss. The NVDIMM-N 200 also can be operable to restore the contents of the identified portion of the DRAM 205 stored in the NVM 212 back to the identified portion of the DRAM 205 upon restoration of power.

Figure 3:
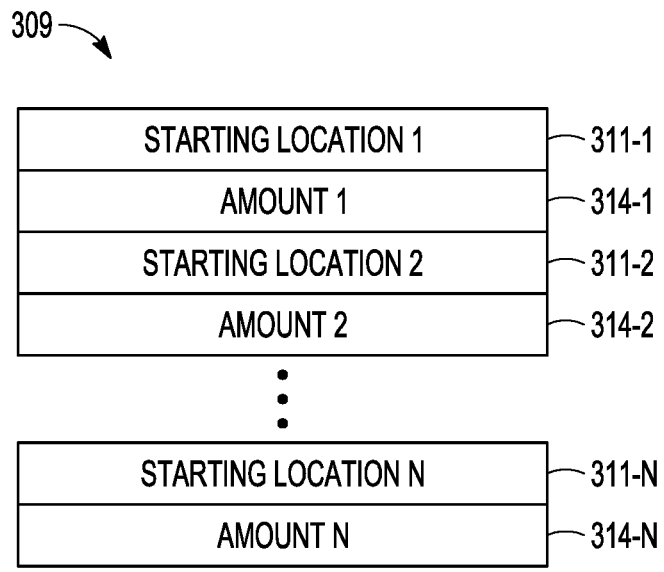
FIG. 3 is a representation of an example of a set of registers in a non-volatile dual in-line memory module, in accordance with various embodiments.

FIG. 3 is a representation of an embodiment of an example of a set of registers 309 in a NVDIMM. For example, the NVDIMM may be the NVDIMM-N 200 of FIG. 2. The set of registers 309 can include a number of location registers 311-1, 311-2 . . . 311-N, which provide an identification of a starting location for a save from volatile memory to non-volatile memory. Having a number of location registers provides for a partial save of memory in which the partial save includes different segments of a portion of the volatile memory that is being saved. For N segments, there would be starting location 1, starting location 2 . . . starting location N. Each starting location may be provided by an offset, an address, an address pointer, or other values or combinations of values that would identity the starting location for the save operation.

Associated with the location registers 311-1, 311-2 . . . 311-N are amount of content registers 314-1, 314-2 . . . 314-N segment would specify an amount of data to be saved from each staring location. Since these registers are associated with a partial save event, an amount of content registers 314-1, 314-2 . . . 314-N may be referred to as partial save length registers 314-1, 314-2 . . . 314-N. The registers 311-1, 311-2 . . . 311-N and 314-1, 314-2 . . . 314-N can be arranged in a number of different formats. For example, the set of control registers 309 can include multiple pairs of registers, each pair of registers configured to contain a starting offset and an amount of content to save for different segments of the portion of the dynamic random-access memory. An example of a pair of such registers is register 311-2 and register 314-2. Address bits associated with the logical address to physical location mapping can be muxed to select column/row/bank/bank group in the save starting locations and length.

The NVDIMM can be configured to disable partial save and to back up all of the dynamic random-access memory for save and restore when one or more partial save length registers have been a defined value to disable partial save. The defined value can be a number that represents the full capacity of the memory to be saved, which can eliminate the process of starting at a particular location for a specified amount of content. Alternatively, the defined value to disable partial save can be zero, since there is not a partial save.

Figure 4:
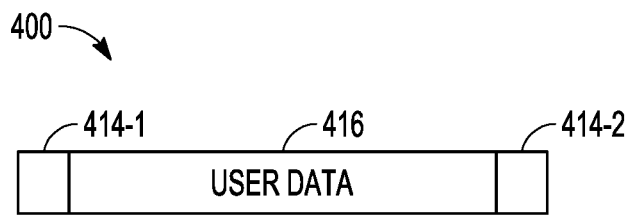
FIG. 4 is a representation of a segment having user data that has been moved from volatile memory to non-volatile memory in a non-volatile dual in-line memory module with additional data, in accordance with various embodiments.

FIG. 4 is a representation of a segment 400 having user data 416 that has been moved from volatile memory to non-volatile memory in a NVDIMM with additional data 414-1 and 414-2. For example, the NVDIMM may be the NVDIMM-N 200 of FIG. 2. The NVDIMM can store segments of user data from the portion of the dynamic random-access memory, where each segment includes error-correcting code data and internal routing data correlated to the user data of the respective segment. The error-correcting code data and the internal routing data can be divided into two parts 414-1 and 414-2 with the two parts 414-1 and 414-2 stored at opposite ends of a continuous storage area of each respective segment.

Figure 5:
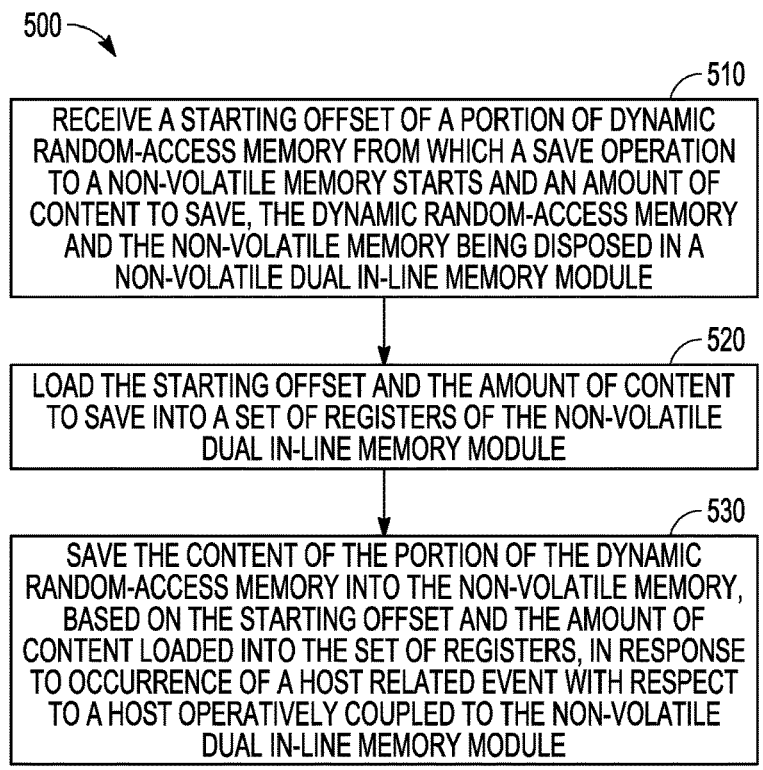
FIG. 5 is a flow diagram of features of an example method of preparing a non-volatile dual in-line memory module for a partial memory save, in accordance with various embodiments.

FIG. 5 is a flow diagram of features of an embodiment of an example method 500 of preparing a non-volatile dual in-line memory module for a partial memory save. The method 500 or methods similar to the method 500 may be deployed on example the NVDIMM-N 200 of FIG. 2 and, accordingly, is described merely by way of example with reference thereto. It will be appreciated that the method 500 or methods similar to the method 500 may be deployed on other hardware configurations. Likewise, the example NVDIMM-N 200 of FIG. 2 may be used to deploy other methods for preparing a non-volatile dual in-line memory module for a partial memory save. At operation 510, a starting offset of a portion of dynamic random-access memory from which a save operation to a non-volatile memory starts and an amount of content to save is received. The dynamic random-access memory and the non-volatile memory are disposed in a non-volatile dual in-line memory module, such as the NVDIMM-N 200 of FIG. 2. The starting offset and the amount of content to save can be received by the NVDIMM-N 200 from the host 220 via the I²C bus 242.

At operation 520, the starting offset and the amount of content to save are loaded into a set of registers of the non-volatile dual in-line memory module, for example the set of registers 209 of the NVDIMM-N 200. At operation 530, the content of the portion of the dynamic random-access memory is saved into the non-volatile memory, based on the starting offset and the amount of content loaded into the set of registers, in response to an occurrence of a host related event with respect to a host operatively coupled to the non-volatile dual in-line memory module. The host related event can be a power loss of the host, such as the host 220 of the NVDIMM-N 200. This power loss can be communicated to the NVDIMM-N 200 via a save_n input. The host related event can be a reception of a message from the host, such as the host 220 via the I²C bus 242 of FIG. 2, directing a controller, such as controller 215, of the non-volatile dual in-line memory module to save the content of the portion of the dynamic random-access memory into the non-volatile memory.

Variations of the method 500 or methods similar to the method 500 can include a number of different embodiments that may be combined depending on the application of such methods and/or the architecture of systems in which such methods are implemented. Variations of the method 500 or methods similar to the method 500 can include operating a non-volatile dual in-line memory module for partial memory save, as taught herein. Such methods can include restoring the content of the portion of the dynamic random-access memory saved into the non-volatile memory back into the portion of the dynamic random-access memory based on the starting offset and the amount of content loaded into the set of registers. Such variations of methods can include restoring the content of the portion of the dynamic random-access memory saved into the non-volatile memory back into the portion of the dynamic random-access memory based on internal routing data stored with user data, the user data being content from the portion of the dynamic random-access memory saved into the non-volatile memory.

Figure 6:
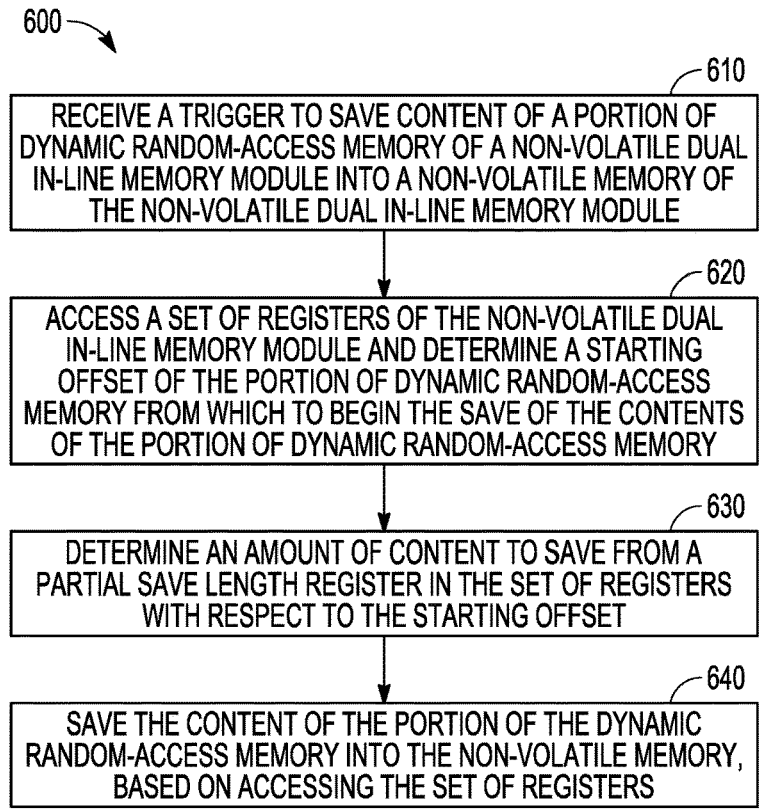
FIG. 6 is a flow diagram of features of an example method of conducting a partial save of memory in a non-volatile dual in-line memory module, in accordance with various embodiments.

FIG. 6 is a flow diagram of features of an embodiment of an example method 600 of conducting a partial save of memory in a non-volatile dual in-line memory module. The method 600 or methods similar to the method 600 may be deployed on the example NVDIMM-N 200 of FIG. 2 and, accordingly, is described merely by way of example with reference thereto. It will be appreciated that the method 600 or methods similar to the method 600 may be deployed on other hardware configurations. Likewise, the example NVDIMM-N 200 of FIG. 2 may be used to deploy other methods for preparing a non-volatile dual in-line memory module for a partial memory save. At operation 610, a trigger to save content of a portion of dynamic random-access memory of a non-volatile dual in-line memory module into a non-volatile memory of the non-volatile dual in-line memory is received. For example, the trigger can be signal save_n from the host 220 to the controller 215 in the architecture of FIG. 2. Alternatively, the trigger can be a message from the host 220 to the NVDIMM-N 200 via the I²C bus 242 in the architecture of FIG. 2.

At operation 620, a set of registers of the non-volatile dual in-line memory is accessed and a starting offset of the portion of dynamic random-access memory from which to begin the save of the contents of the portion of dynamic random-access memory is determined. For example, the set of registers 209 of NVDIMM-N 200 can be accessed through execution of the controller 215 in the architecture of FIG. 2. The determination of the starting offset may include reading the set of registers or reading the set of registers and translating the read data regarding starting location into the appropriate starting location. Accessing the set of registers and determining the starting offset can include accessing multiple registers of the set of registers to obtain multiple starting offsets, each starting offset correlated to a segment of the portion different from the other starting offsets obtained. Each segment of the portion of the dynamic random-access memory can be restored based on the starting offsets obtained for the respective segments in response to a signal from a host that generated the offsets.

At operation 630, an amount of content to save from a partial save length register in the set of registers with respect to the starting offset is determined. Determining the amount of content to save can include determining that the amount of content to save includes all of the dynamic random-access memory when the partial save length register has a defined value to disable partial save. The defined value can be zero to identify no partial save or some other value to identify a save of the full memory.

At operation 640, the content of the portion of the dynamic random-access memory is saved into the non-volatile memory, based on accessing the set of registers. Variations of the method 600 or methods similar to the method 600 can include a number of different embodiments that may be combined depending on the application of such methods and/or the architecture of systems in which such methods are implemented. Variations of the method 600 or methods similar to the method 600 can include operating a non-volatile dual in-line memory module for a partial memory save, as taught herein.

Figure 7:
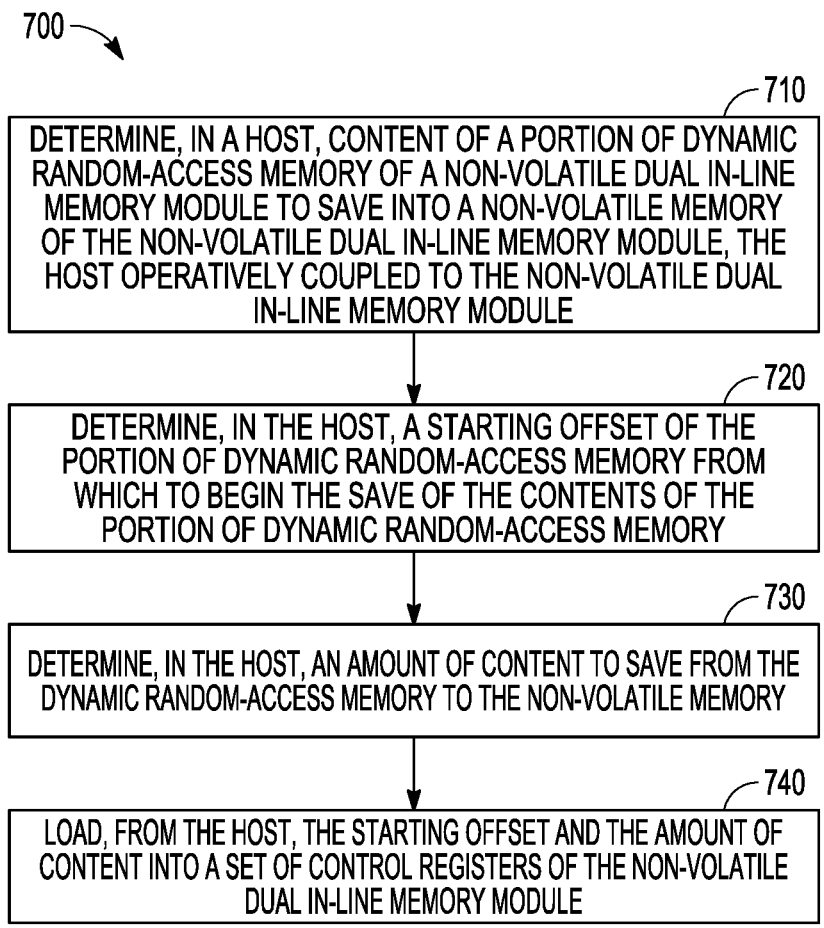
FIG. 7 is a flow diagram of features of an example method of a host preparing a non-volatile dual in-line memory module for a partial memory save, in accordance with various embodiments.

FIG. 7 is a flow diagram of features of an embodiment of an example method 700 of a host preparing a non-volatile dual in-line memory module for a partial memory save. The method 700 or methods similar to the method 700 may be deployed on example NVDIMM-N 200 of FIG. 2 and, accordingly, is described merely by way of example with reference thereto. It will be appreciated that the method 700 or methods similar to the method 700 may be deployed on other hardware configurations. Likewise, the example NVDIMM-N 200 of FIG. 1 may be used to deploy other methods for preparing a non-volatile dual in-line memory module for a partial memory save. At operation 710, in a host, content of a portion of dynamic random-access memory of a non-volatile dual in-line memory module to save into a non-volatile memory of the non-volatile dual in-line memory is determined, where the host is operatively coupled to the non-volatile dual in-line memory module. For example, the host may be the host 220 operatively coupled to the NVDIMM-N 200 of FIG. 2. Determination of content in memory to be saved in a non-volatile dual in-line memory module can provide the host with the ability to have better control, and more control over what is saved and restored.

At operation 720, in the host, a starting offset of the portion of dynamic random-access memory from which to begin the save of the contents of the portion of dynamic random-access memory is determined. At operation 730, in the host, an amount of content to save from the dynamic random-access memory to the non-volatile memory is determined. At operation 740, the starting offset and the amount of content into a set of control registers of the non-volatile dual in-line memory module is loaded from the host. Loading, from the host, the starting offset and the amount of content can include using an application program interface between the host and the non-volatile dual in-line memory module.

Variations of the method 700 or methods similar to the method 700 can include a number of different embodiments that may be combined depending on the application of such methods and/or the architecture of systems in which such methods are implemented. Variations of the method 700 or methods similar to the method 700 can include operating a non-volatile dual in-line memory module for partial memory save, as taught herein. Such methods can include disabling, by the host, partial save of the dynamic random-access memory by loading a partial save length register of the set of registers with a defined value to disable partial save. Such methods can include generating a message in the host and sending the message to a controller of the non-volatile dual in-line memory module to restore contents saved in a partial save to the non-volatile memory back to the dynamic random-access memory.

In various embodiments, a non-volatile dual in-line memory module comprises: dynamic random-access memory arranged to store user data; non-volatile memory arranged to back up contents of the dynamic random-access memory; and a set of control registers configured to contain an identification of a portion of the dynamic random-access memory from which to back up content to the non-volatile memory. The set of control registers can be configured to contain a starting offset of the portion of the dynamic random-access memory from which a save operation to the non-volatile memory starts and an amount of content to save. The set of control registers can contain a partial save length register. The non-volatile dual in-line memory module can be configured to disable partial save and to back up all of the dynamic random-access memory for save and restore when the partial save length register has a defined value to disable partial save. The defined value to disable partial save can be zero.

The non-volatile dual in-line memory module can be arranged to be operable to store the contents of the identified portion of the dynamic random-access memory in the non-volatile memory in a non-power off mode. The non-volatile dual in-line memory module can be arranged to be operable to store the contents of the identified portion of the dynamic random-access memory in the non-volatile memory upon power loss by a host coupled to the non-volatile dual in-line memory module or a detection of power loss. The non-volatile dual in-line memory module can be arranged to be operable to restore the contents of the identified portion of the dynamic random-access memory stored in the non-volatile memory back to the identified portion of the dynamic random-access memory upon restoration of power. The non-volatile dual in-line memory module can include various features or combinations of features as taught herein.

In various embodiments, a system comprises: a host; and a non-volatile dual in-line memory module operatively coupled to the host, where the non-volatile dual in-line memory module includes: dynamic random-access memory arranged to store user data; non-volatile memory arranged to back up contents of the dynamic random-access memory; a controller to control the dynamic random-access memory and the non-volatile memory; and a set of control registers configured to contain an identification of a portion of the dynamic random-access memory from which to back up content to the non-volatile memory. The host can have an application program interface with the non-volatile dual in-line memory module to specify a starting offset in the portion of the dynamic random-access memory from which a save operation to the non-volatile memory starts and an amount of content to save to be loaded into the set of control registers. The host can have a command set that includes a command to the non-volatile dual in-line memory module to store the contents of the identified portion of the dynamic random-access memory in the non-volatile memory with the host in a non-power off mode. The controller can be configured to execute the command received from the host.

The set of control registers can include multiple pairs of registers, where each pair of registers is configured to contain a starting offset and an amount of content to save for different segments of the portion of the dynamic random-access memory. The non-volatile memory can store segments of user data from the portion of the dynamic random-access memory, each segment including error-correcting code data and internal routing data correlated to the user data of the respective segment. The error-correcting code data and the internal routing data can be divided into two parts with the two parts stored at opposite ends of a continuous storage area of each respective segment. The system can include various features or combinations of features as taught herein.

Figure 8:
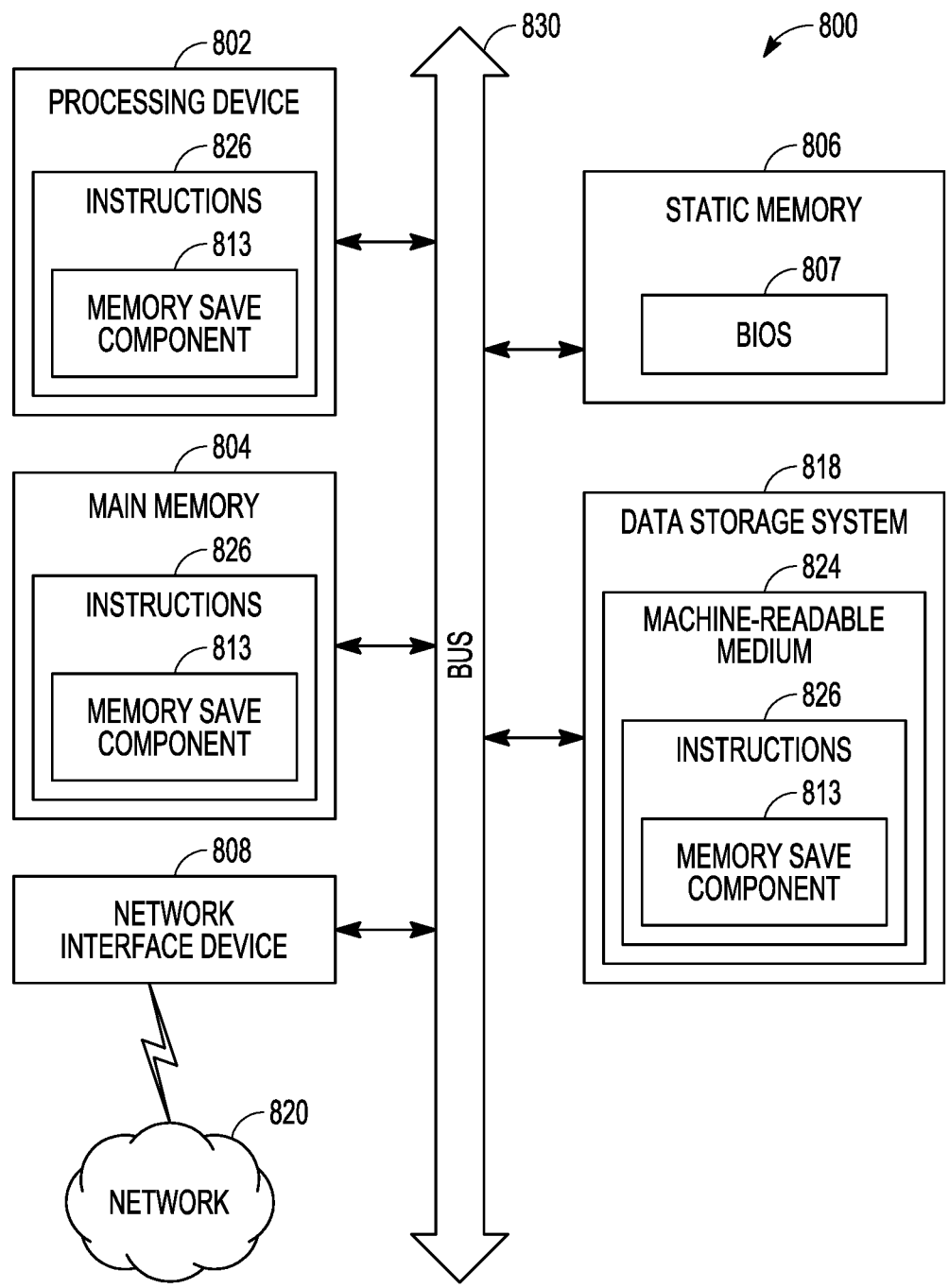
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory save component 113 of FIG. 1 or other memory save components as taught herein). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or registered DRAM (RDRAM), etc.), a static memory 806 (e.g., flash memory, static random access memory (SRAM), etc.) that may store a BIOS 807, and a data storage system 818, which communicate with each other via a bus 830.

The processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality of a memory save component 813, which can be similar to the memory save component 113 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. The following are example embodiments of methods, apparatus, and systems, in accordance with the teachings herein.

An example non-volatile dual in-line memory module 1 can comprise: dynamic random-access memory arranged to store user data; non-volatile memory arranged to back up contents of the dynamic random-access memory; and a set of control registers configured to contain an identification of a portion of the dynamic random-access memory from which to back up content to the non-volatile memory.

An example non-volatile dual in-line memory module 2 can comprise elements of example non-volatile dual in-line memory module 1, wherein the set of control registers is configured to contain a starting offset of the portion of the dynamic random-access memory from which a save operation to the non-volatile memory starts and an amount of content to save.

An example non-volatile dual in-line memory module 3 can comprise elements of any preceding example non-volatile dual in-line memory modules, wherein the non-volatile dual in-line memory module is operable to store the contents of the identified portion of the dynamic random-access memory in the non-volatile memory in a non-power off mode.

An example non-volatile dual in-line memory module 4 can comprise elements of any preceding example non-volatile dual in-line memory modules, wherein the non-volatile dual in-line memory module is operable to store the contents of the identified portion of the dynamic random-access memory in the non-volatile memory upon power loss by a host coupled to the non-volatile dual in-line memory module or a detection of power loss.

An example non-volatile dual in-line memory module 5 can comprise elements of any preceding example non-volatile dual in-line memory modules, wherein the non-volatile dual in-line memory module is operable to restore the contents of the identified portion of the dynamic random-access memory stored in the non-volatile memory back to the identified portion of the dynamic random-access memory upon restoration of power.

An example non-volatile dual in-line memory module 6 can comprise elements of any preceding example non-volatile dual in-line memory modules, wherein the set of control registers contains a partial save length register and the non-volatile dual in-line memory module is configured to disable partial save and to back up all of the dynamic random-access memory for save and restore when the partial save length register has a defined value to disable partial save.

An example non-volatile dual in-line memory module 3 can comprise elements of any preceding example non-volatile dual in-line memory modules, wherein the defined value to disable partial save is zero.

An example system 1 can comprise: a host; and a non-volatile dual in-line memory module operatively coupled to the host, the non-volatile dual in-line memory module including: dynamic random-access memory arranged to store user data; non-volatile memory arranged to back up contents of the dynamic random-access memory; a controller to control the dynamic random-access memory and the non-volatile memory; and a set of control registers configured to contain an identification of a portion of the dynamic random-access memory from which to back up content to the non-volatile memory.

An example system 2 can comprise elements of example system 1, wherein the host has an application program interface with the non-volatile dual in-line memory module to specify a starting offset in the portion of the dynamic random-access memory from which a save operation to the non-volatile memory starts and an amount of content to save to be loaded into the set of control registers.

An example system 3 can comprise elements of any preceding example systems, wherein the host has a command set that comprises a command to the non-volatile dual in-line memory module to store the contents of the identified portion of the dynamic random-access memory in the non-volatile memory with the host in a non-power off mode.

An example system 4 can comprise elements of any preceding example systems, wherein the controller is configured to execute the command received from the host.

An example system 5 can comprise elements of any preceding example systems, wherein the set of control registers comprises multiple pairs of registers, each pair of registers configured to contain a starting offset and an amount of content to save for different segments of the portion of the dynamic random-access memory.

An example system 6 can comprise elements of any preceding example systems, wherein the non-volatile memory stores segments of user data from the portion of the dynamic random-access memory, each segment including error-correcting code data and internal routing data correlated to the user data of the respective segment.

An example system 7 can comprise elements of any preceding example systems, wherein the error-correcting code data and the internal routing data are divided into two parts with the two parts stored at opposite ends of a continuous storage area of each respective segment.

An example method 1 can comprise: receiving a starting offset of a portion of dynamic random-access memory from which a save operation to a non-volatile memory starts and an amount of content to save, the dynamic random-access memory and the non-volatile memory disposed in a non-volatile dual in-line memory module; loading the starting offset and the amount of content to save into a set of registers of the non-volatile dual in-line memory module; and saving content of the portion of the dynamic random-access memory into the non-volatile memory, based on the starting offset and the amount of content loaded into the set of registers, in response to an occurrence of a host related event with respect to a host operatively coupled to the non-volatile dual in-line memory module.

An example method 2 can comprise elements of example method 1, wherein the host related event is a power loss of the host.

An example method 3 can comprise elements of any preceding example methods, further comprising restoring the content of the portion of the dynamic random-access memory saved into the non-volatile memory back into the portion of the dynamic random-access memory based on the starting offset and the amount of content loaded into the set of registers.

An example method 4 can comprise elements of any preceding example methods, wherein further comprising restoring the content of the portion of the dynamic random-access memory saved into the non-volatile memory back into the portion of the dynamic random-access memory based on internal routing data stored with user data, the user data being content from the portion of the dynamic random-access memory saved into the non-volatile memory.

An example method 5 can comprise elements of any preceding example methods, wherein the host related event is a reception of a message from the host directing a controller of the non-volatile dual in-line memory module to save the content of the portion of the dynamic random-access memory into the non-volatile memory.

An example method 6 can comprise: receiving a trigger to save content of a portion of dynamic random-access memory of a non-volatile dual in-line memory module into a non-volatile memory of a non-volatile dual in-line memory module; accessing a set of registers of the non-volatile dual in-line memory module and determining a starting offset of the portion of dynamic random-access memory from which to begin the save of the contents of the portion of dynamic random-access memory; determining an amount of content to save from a partial save length register in the set of registers with respect to the starting offset; and saving the content of the portion of the dynamic random-access memory into the non-volatile memory, based on accessing the set of registers.

An example method 7 can comprise elements of example method 6, wherein accessing the set of registers and determining the starting offset comprises accessing multiple registers of the set of registers to obtain multiple starting offsets, each starting offset correlated to a segment of the portion different from the other starting offsets obtained.

An example method 8 can comprise elements of any preceding example methods 6 and 7, further comprising restoring each segment of the portion of the dynamic random-access memory based on the starting offsets obtained for the respective segments in response to a signal from a host that generated the offsets.

An example method 9 can comprise elements of any preceding example methods 6-8, wherein determining the amount of content to save comprises determining that the amount of content to save comprises all of the dynamic random-access memory when the partial save length register has a defined value to disable partial save.

An example method 10 can comprise: determining, in a host, content of a portion of dynamic random-access memory of a non-volatile dual in-line memory module to save into a non-volatile memory of the non-volatile dual in-line memory module, the host operatively coupled to the non-volatile dual in-line memory module; determining, in the host, a starting offset of the portion of dynamic random-access memory from which to begin the save of the contents of the portion of dynamic random-access memory; determining, in the host, an amount of content to save from the dynamic random-access memory to the non-volatile memory; and loading, from the host, the starting offset and the amount of content into a set of control registers of the non-volatile dual in-line memory module.

An example method 11 can comprise elements of example method 10, further comprising disabling, by the host, partial save of the dynamic random-access memory by loading a partial save length register of the set of registers with a defined value to disable partial save.

An example method 12 can comprise elements of any preceding example methods 10 and 11, further comprising generating a message in the host and sending the message to a controller of the non-volatile dual in-line memory module to restore contents saved in a partial save to the non-volatile memory back to the dynamic random-access memory.

An example method 13 can comprise elements of any preceding example methods 10-12, wherein loading, from the host, the starting offset and the amount of content comprises using an application program interface between the host and the non-volatile dual in-line memory module.

Although specific embodiments have been illustrated and described herein, it will be appreciated by those of ordinary skill in the art that other arrangements derived from the teachings herein may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A non-volatile, dual in-line memory module comprising:
    dynamic random-access memory arranged to store user data;
    non-volatile memory arranged to back up contents of the dynamic random-access memory;
    a set of control registers; and
    a controller configured to perform operations comprising:
        receiving a starting offset of a portion of dynamic random-access memory from which a save operation to the non-volatile memory starts and an amount of content to save;
        loading the starting offset and the amount of content to save into the set of registers; and
        saving content of the portion of the dynamic random-access memory into the non-volatile memory, based on the starting offset and the amount of content loaded into the set of registers, in response to an occurrence of a host related event with respect to a host operatively coupled to the non-volatile dual in-line memory module.

2. The non-volatile dual in-line memory module of claim 1, wherein the non-volatile dual in-line memory module is operable to store the contents of the portion of the dynamic random-access memory in the non-volatile memory in a non-power off mode.

3. The non-volatile dual in-line memory module of claim 1, wherein the non-volatile dual in-line memory module is operable to store the contents of the portion of the dynamic random-access memory in the non-volatile memory upon power loss by the host coupled to the non-volatile dual in-line memory module or a detection of power loss.

4. The non-volatile dual in-line memory module of claim 3, wherein the non-volatile dual in-line memory module is operable to restore the contents of the portion of the dynamic random-access memory stored in the non-volatile memory back to the portion of the dynamic random-access memory upon restoration of power.

5. The non-volatile dual in-line memory module of claim 1, wherein the set of control registers contains a partial save length register and the non-volatile dual in-line memory module is configured to disable partial save and to back up all of the dynamic random-access memory when the partial save length register has a defined value to disable partial save.

6. The non-volatile dual in-line memory module of claim 5, wherein the defined value to disable partial save is zero.

7. A method comprising:
    receiving, by a controller of a non-volatile dual in-line memory module, a starting offset of a portion of dynamic random-access memory from which a save operation to a non-volatile memory starts and an amount of content to save, the non-volatile dual in-line memory module comprising the dynamic random-access memory and the non-volatile memory;
    loading, by the controller, the starting offset and the amount of content to save into a set of registers of the non-volatile dual in-line memory module; and
    saving, by the controller, content of the portion of the dynamic random-access memory into the non-volatile memory, based on the starting offset and the amount of content loaded into the set of registers, in response to an occurrence of a host related event with respect to a host operatively coupled to the non-volatile dual in-line memory module.

8. The method of claim 7, wherein the host related event is a power loss of the host.

9. The method of claim 8, further comprising restoring the content of the portion of the dynamic random-access memory saved into the non-volatile memory back into the portion of the dynamic random-access memory based on the starting offset and the amount of content loaded into the set of registers.

10. The method of claim 8, further comprising restoring the content of the portion of the dynamic random-access memory saved into the non-volatile memory back into the portion of the dynamic random-access memory based on internal routing data stored with user data, the user data being content from the portion of the dynamic random-access memory saved into the non-volatile memory.

11. The method of claim 7, wherein the host related event is a reception of a message from the host directing the controller of the non-volatile dual in-line memory module to save the content of the portion of the dynamic random-access memory into the non-volatile memory.

12. A method comprising:
    receiving, by a controller of a non-volatile dual in-line memory module, a trigger to save content of a portion of dynamic random-access memory of the non-volatile dual in-line mentor), module into a non-volatile memory of the non-volatile dual in-line memory module;

accessing, by the controller, a set of registers of the non-volatile dual in-line memory module to determine a starting offset of the portion of dynamic random-access memory from which to begin the save of the contents of the portion of dynamic random-access memory;

accessing, by the controller, a partial save length register in the set of registers to determine an amount of content to save, the partial save length register being associated with respect to the starting offset; and saving, by the controller, the content of the portion of the dynamic random-access memory into the non-volatile memory, based on the determined starting offset and the determined amount of content to save.

13. The method of claim 12, wherein the accessing the set of registers to determine the starting offset comprises accessing multiple registers of the set of registers to obtain multiple starting offsets, each starting offset correlated to a segment of the portion different from the other starting offsets obtained.

14. The method of claim 13, further comprising restoring each segment of the portion of the dynamic random-access memory based on the starting offsets obtained for the segments in response to a signal from a host that generated the offsets.

15. The method of claim 12, further comprising determining that the amount of content to save comprises all of the dynamic random-access memory when the partial save length register has a defined value to disable partial save.

16. A method comprising:
determining, by a host, content of a portion of dynamic random-access memory of a non-volatile dual in-line memory module to save into a non-volatile memory of the non-volatile dual in-line memory module, the host operatively coupled to the non-volatile dual in-line memory module;

determining, by the host, a starting offset of the portion of dynamic random-access memory from which to begin the save of the contents of the portion of dynamic random-access memory;

determining, by the host, an amount of content save from the dynamic random-access memory to the non-volatile memory; and loading, from the host into a set of control registers of the note-volatile dual in-line memory module, the starting offset and the amount of content.

17. The method of claim 16, further comprising disabling, by the host, partial save of the dynamic random-access memory by loading, from the host into the set of control registers, a partial save length register of the set of registers with a defined value to disable partial save.

18. The method of claim 16, further comprising generating, by the host, a message and sending the message, from the host to a controller of the non-volatile dual in-line memory module, to restore contents saved in a partial save to the non-volatile memory back to the dynamic random-access memory.

19. The method of claim 16, wherein loading, from the host into the set of control registers, the starting offset and the amount of content comprises using an application program interface between the host and the non-volatile dual in-line memory module.

* * * * *